United States Patent [19]
Haag, III

[11] Patent Number: 5,567,025
[45] Date of Patent: Oct. 22, 1996

[54] PORT SYSTEM FOR STERILE TRANSFER

[76] Inventor: Earl C. Haag, III, 2933 Herrlyn Ct., Dallastown, Pa. 17313

[21] Appl. No.: 319,125

[22] Filed: Oct. 6, 1994

[51] Int. Cl.$^6$ .................................................. A61G 11/00
[52] U.S. Cl. ............................ 312/1; 220/377; 312/296
[58] Field of Search ................................. 312/1, 3, 4, 5, 312/6, 296, 297, 293.1; 34/242; 52/171.1; 220/377, 359, 254, 602, 663, 664; 55/385.2; 49/466, 62, 61; 454/187

[56] References Cited

U.S. PATENT DOCUMENTS

| | | | |
|---|---|---|---|
| 3,097,389 | 9/1975 | Cox et al. | 312/1 |
| 4,111,753 | 9/1978 | Folsom et al. | 312/1 X |
| 4,162,196 | 7/1979 | Folsom et al. | 312/1 X |
| 4,209,126 | 6/1980 | Elias | 220/359 X |
| 5,056,875 | 10/1991 | Akins | 312/1 |
| 5,219,215 | 6/1993 | Akagawa et al. | 312/1 |
| 5,230,437 | 7/1993 | Kelly | 220/377 X |
| 5,275,479 | 1/1994 | Cruz et al. | 312/1 |
| 5,425,793 | 6/1995 | Mori et al. | 454/187 |

FOREIGN PATENT DOCUMENTS

| | | | |
|---|---|---|---|
| 5296509 | 11/1993 | Japan | 454/187 |
| 2262786 | 6/1993 | United Kingdom | 312/1 |

Primary Examiner—Peter M. Cuomo
Assistant Examiner—Janet M. Wilkens
Attorney, Agent, or Firm—Charles J. Long

[57] ABSTRACT

A port system for allowing transfer of material between sterile environments in two walled enclosures includes film members attached to each of the enclosures and covering ports through the walls of the enclosures. The exterior surfaces of the film members are coated with adhesives of a type which will cause the film members to adhere when brought into contact with each other. To transfer material, the enclosures are brought together with film covered ports in alignment, and upon contact the adhesive covered surfaces cause the film members to adhere. The film members are constructed and arranged so that the portions covering the ports in the walls of the enclosures can be separated from the portions surrounding the ports. After adherence, the separable portions are removed, enabling transfer to occur through the now open ports. Since the adhesive surfaces of the film members are the only surfaces exposed to the outside atmosphere, when they are brought together in adhering relationship, each effectively covers the exposed surface of the other, thereby preventing contamination of the sterile environments maintained in the enclosures.

9 Claims, 4 Drawing Sheets

PORT SYSTEM FOR STERILE TRANSFER

BACKGROUND OF THE INVENTION

1. Field of the Invention

This invention relates to the transfer of materials from one walled enclosure to another without exposing the transferred material to the atmosphere outside the enclosure. More particularly, the invention relates to a port system for allowing such transfer between sterile environments.

2. Description of the Prior Art

In the pharmaceutical manufacturing industry, as well as in other industries such as semiconductor manufacturing, the need frequently arises to transfer sterile material, such as ingredients or equipment, from one sterile environment to another. For example, in some such operations sterile material must be moved from one sterile enclosure to another through a non-sterile environment. In order to preserve the sterility of the material being moved, such an operation is normally carried out by transferring the material from the first enclosure into a transfer container which itself has a sterile interior environment; the transfer container is then moved to the second enclosure and the material transferred from the container to the enclosure. In this specification and the claims following, both the sterile enclosures and the transfer container of this example, as well as other similar structures, are referred to by the general term "walled enclosures."

A major problem in transferring sterile material from the sterile environment in one walled enclosure to that in another has been to provide doors or the like in the enclosure walls which minimize the possibility of contamination from either the outside atmosphere or the non-sterile surfaces of the doors themselves. The prior art includes several approaches to solving this problem, but all suffer from one or more deficiencies. For example, Cruz et al. U.S. Pat. No. 5,275,479 discloses a device and method for transferring objects between two containers while maintaining the sterility of the internal environments of the containers and objects, wherein each container includes a door, formed of Mylar® film, for abutment against the door of the other container. Once in abutment with one another, the doors are removed to permit transfer of the object. However, the doors of Cruz et al. abut only on their peripheral edges, resulting in a volume of outside air trapped between the doors, and further this device uses a complicated winding system for moving the doors. Cox et al. U.S. Pat. No. 3,097,389 discloses an environmental chamber including an access opening designed to communicate with a corresponding access opening of a container for transferring an object between the chamber and the container while maintaining the sterility of the object and the internal environments of the container and chamber. Both the container and the chamber include respective doors covering the openings which are removed upon connection of the container to the chamber to permit transfer of the object. However, the device of Cox et al. uses a sliding door arrangement in which at least one of the doors is exposed to the outside environment during attachment of the container, thereby preventing further sterile use. Akins U.S. Pat. No. 5,056,875 discloses a system similar to one offered by the French company la Calhene and called "DPTE," in which doors and their frames on the two enclosures are brought together and the doors are mechanically joined and removed from the frames leaving a transfer opening. In order to enable their removal after being joined, the individual door edges are beveled to form a continuous beveled edge in the joined doors, which permits the composite structure to be removed in the direction in which the bevel enlarges the door openings. Such door construction unavoidably includes surfaces, such as the beveled door edges, which cannot be properly cleaned and thus are sources of possible contamination.

SUMMARY OF THE INVENTION

I have developed a port system for sterile transfer which minimizes the amount of uncleanable surface, e.g. in the preferred embodiment such surface is only as wide as two thicknesses of aluminum foil and extends only around the interior edge of the pass-through opening; my system also eliminates trapping of outside air in the connection between sterile enclosures, and is simple in construction and use.

In accordance with the invention, I provide a system for allowing the transfer of material between first and second walled enclosures without exposing the enclosure interior or the transferred material to the atmosphere outside the enclosures, comprising a) a first port in a wall of the first enclosure; b) a second port in a wall of the second enclosure, the second port being of the same size and shape as the first port; c) first and second impermeable film barrier means sealingly attached respectively to the first and second enclosures and covering the first and second ports respectively, the first and second film barrier means each comprising a substantially planar surface exterior to its respective enclosure and at or above the surface of the enclosure wall surrounding it, each film barrier means being so constructed and arranged that the portion thereof coextensive with its respective port can be separated from the remainder thereof; and d) adhesive means applied to the exterior surface of at least one of the first and second film barrier means and capable of causing the exterior surfaces of both said film barrier means to adhere when brought into contact with one another.

In a preferred embodiment, I provide a port system for allowing the sterile transfer of material between sterile environments maintained in first and second walled enclosures which have been positioned such that a wall of the first enclosure faces and is proximate to a wall of the second enclosure, comprising a) first and second openings formed in the facing walls of the first and second enclosures, respectively; b) first and second outer frame members mounted in the first and second openings respectively, each outer frame member sealingly engaging the enclosure wall around the opening in which it is mounted, the first and second outer frame members respectively defining first and second cylindrical outer ports which are of equal diameters and coaxially aligned, each outer frame member having an exterior surface portion which surrounds its outer port and lies in a plane exterior to the enclosure in which it is mounted; c) first and second cylindrical inner frame members sized to be closely receivable in either of the outer ports, the first and second inner frame members respectively defining first and second pass-through ports of substantially identical size and shape, each inner frame member including an exterior surface which surrounds its pass-through port and lies in a plane perpendicular to its cylindrical axis; d) means for removably and sealingly mounting the first and second inner frame members within the first and second outer ports respectively in positions such that the exterior surface of each inner frame member is flush with the exterior surface portion of its respective outer frame member and faces the exterior surface of the other inner frame member; e) first and second impermeable film members attached respectively to the exterior surfaces of the first and second inner frame members and sealingly covering the first and second pass-through ports respectively, each film member forming a planar surface over its respective pass-through port, the planar surfaces facing each other; f) adhesive means applied to at least one of the planar surfaces and capable of causing the planar surfaces to adhere when brought into contact with each other; g) means for enabling separation of the portion of each film member covering its respective pass-through port from the remainder of the film member; and h) joining means for bringing and holding the first and second outer frame members together in such relationship that the planar surfaces make adhering contact with one another.

In a further preferred embodiment a) the first and second outer frame members comprise first and second base surface portions respectively and first and second walls extending toward each other for equal distances from the first and second base surface portions respectively, the distal extremity of each wall defining an end surface, the walls being shaped and sized such that the second wall can be closely telescopically received within the first wall, the first base surface portion constituting the exterior surface portion of the first outer frame member, the end surface of the second wall constituting the exterior surface portion of the second outer frame member; b) the joining means is so constructed and arranged as to draw the first and second outer frame members telescopically together until their respective exterior surface portions abut, whereby during such drawing together a substantially enclosed space is formed between the first and second film members, the volume of which decreases as the respective exterior surface portions approach each other; and c) the port system further includes means for effecting the removal of air from the space formed between the first and second film members as the first and second frame members are drawn together by the joining means, whereby the first and second planar surfaces make adhering contact when the exterior surface portions of the outer frame members abut.

Preferably the means for removably and sealingly positioning each inner frame member within its respective outer port comprises a first circumferential groove formed in the outer face of the inner frame member, a second circumferential groove formed in the inner face of the outer port in such position that when the first and second circumferential grooves are facing each other the exterior surface of the inner frame member is flush with the exterior surface portion of the outer frame member, and a compressible "O" ring received in the first circumferential groove to a depth such that when the first and second circumferential grooves are facing each other the "O" ring is compressed sufficiently to make sealing contact with the second circumferential groove.

Preferably each of the first and second film members comprises a three-ply construction in which the first ply is aluminum foil extending beyond the edges of the pass-through port and attached to the exterior surface of its respective inner frame member, the aluminum foil ply forming the planar surface and having the adhesive means applied as a layer thereto; the second ply is a removable protective film layer attached to the adhesive means layer; and the third ply is a layer of low density polyethylene film aligned with and sized to conform to the pass-through port and adhesively attached to the surface of the aluminum foil on the reverse side of the planar surface.

To aid in separation of the adhered film portions from the pass-through ports, the surface of each inner frame member which forms the inner face of its pass-through port is sloped such that the pass-through port opening becomes smaller in the direction of the film member.

Preferably the pass-through ports are circular in shape.

Other details, objects and advantages of the invention will become apparent as the following description of a certain present preferred embodiment thereof proceeds.

BRIEF DESCRIPTION OF THE DRAWINGS

In the accompanying drawings I have shown a present preferred embodiment of the invention in which.

In the preferred embodiment shown in the drawing figures all openings and frame members are of circular shape when viewed from the front or rear.

DESCRIPTION OF THE PREFERRED EMBODIMENT

Figure 3:
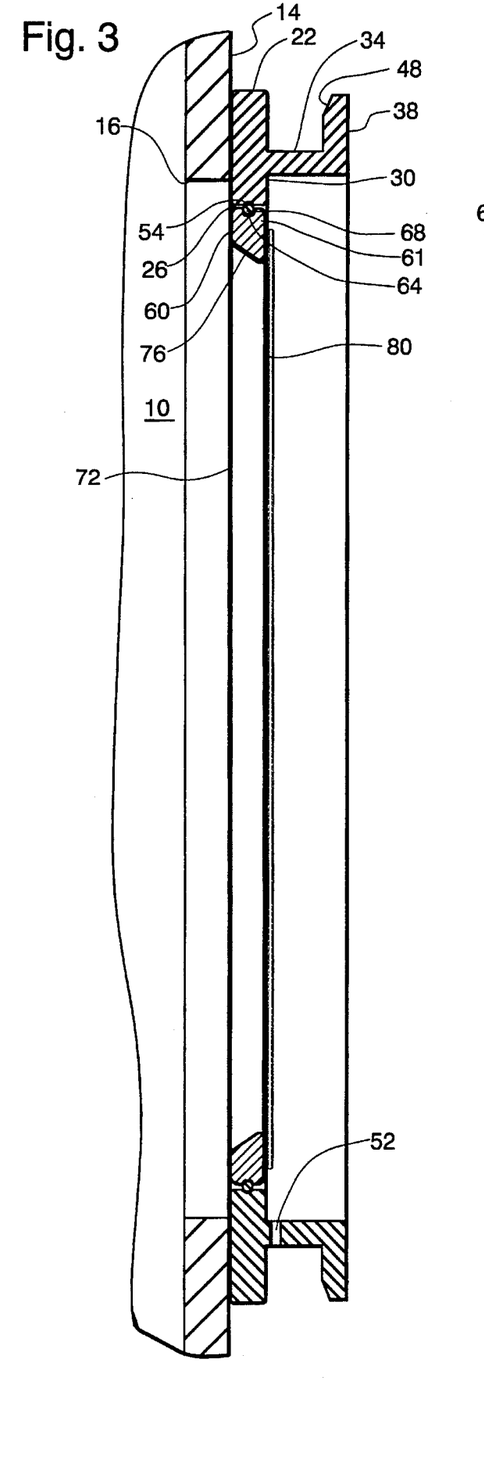
FIG. 3 is a cross sectional view of a first outer frame member attached to a wall of a first walled enclosure, with the first inner frame member and film member in position prior to transfer.
Figure 4:
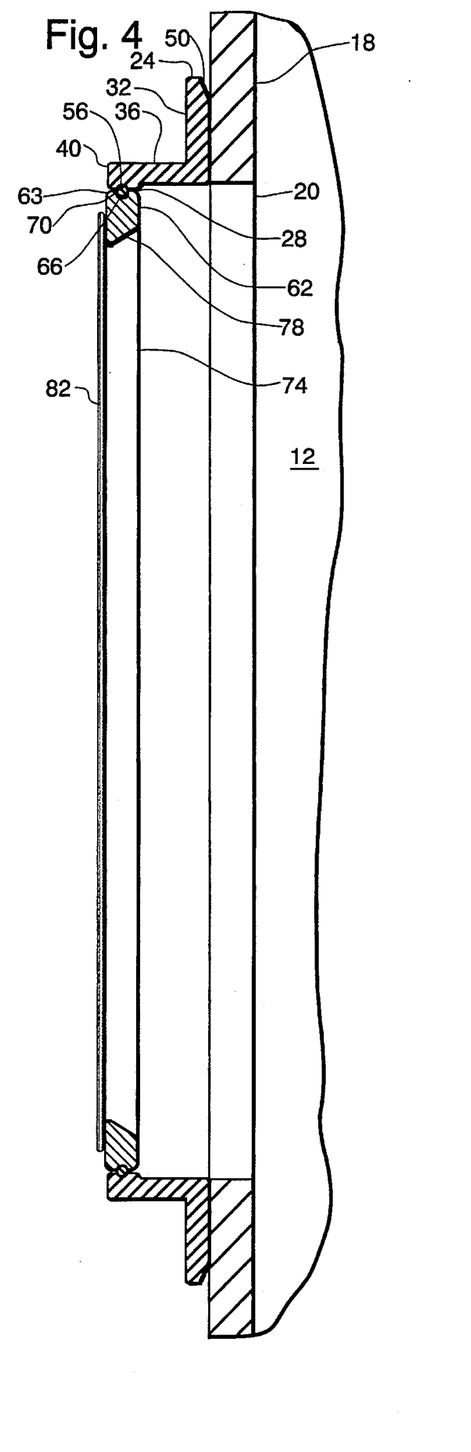
FIG. 4 is a cross sectional view of a second outer frame member attached to the wall of a second walled enclosure, with the second inner frame member and film member in position prior to transfer.
Figure 5:
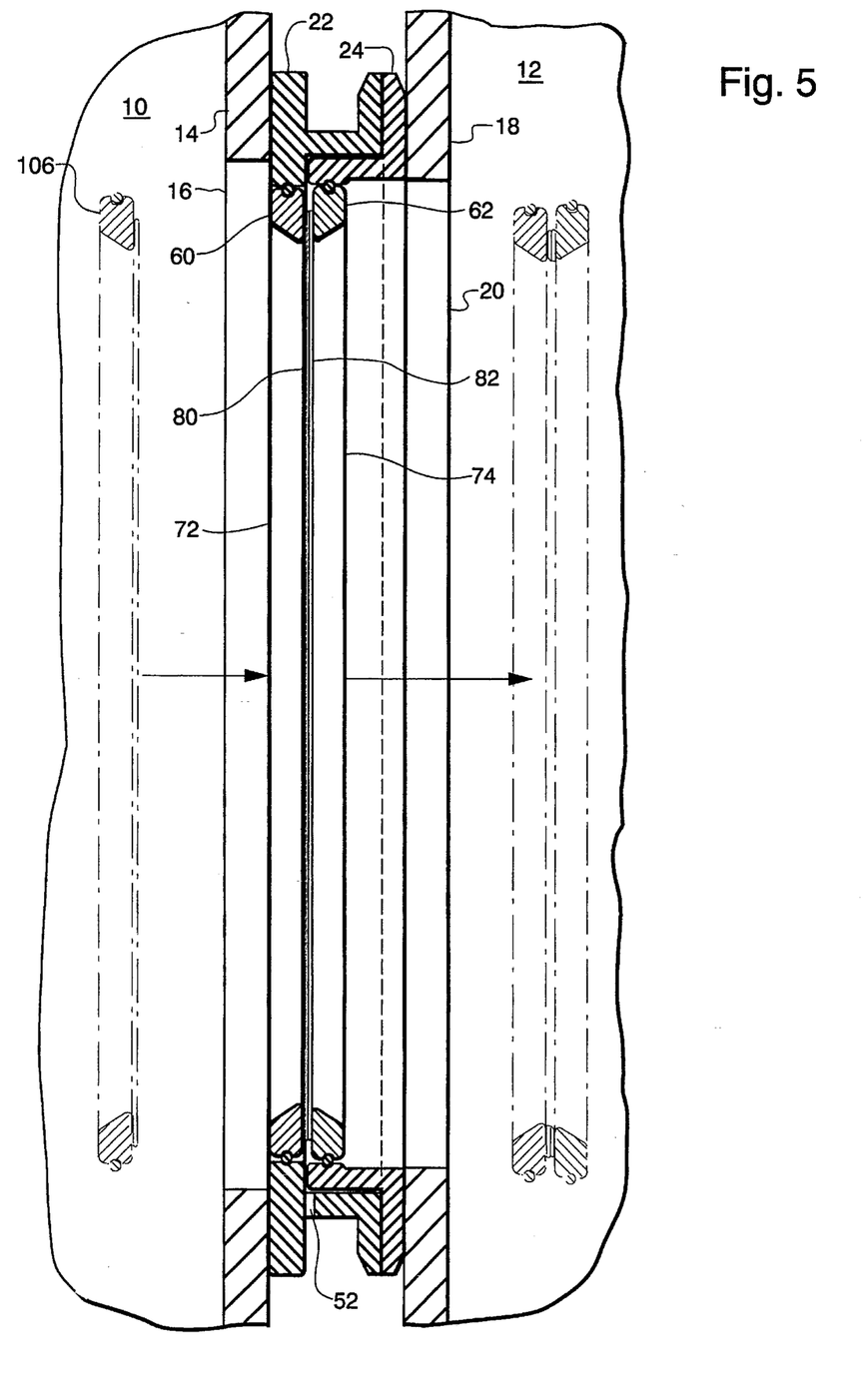
FIG. 5 is a cross sectional view of the structures of FIGS. 3 and 4 in sealed telescopically joined relationship for transfer, with the inner frame members shown in solid lines in transfer position and in phantom lines to the right as removed from the outer frame members following transfer, and with a new first inner frame member and attached film member shown in phantom lines to the left ready to be inserted into position in the first outer frame member to reseal the transfer port of the left-hand walled enclosure following transfer.

Turning first to FIGS. 3 through 5, there are shown cutaway portions of first and second walled enclosures 10, 12 between which sterile material is to be transferred. Prior to transfer of the material, a wall 14 of enclosure 10 and a wall 18 of enclosure 12 are brought proximate to and facing each other; in most applications one of the two enclosures will be a smaller portable unit such that positioning the enclosures as required is not a problem. A first opening 16 is formed in wall 14 of enclosure 10 and a second opening 20 is formed in wall 18 of enclosure 12; although such openings may be of varying shapes depending on the particular enclosure and application, they are both circular in the preferred embodiment shown.

It will be appreciated that depending upon the nature of the operation, the enclosure walls may be of metal, plastic or other material.

A first outer frame member 22 is mounted on and sealingly engages wall 14 of enclosure 10 around opening 16, and a second outer frame member 24 is mounted on and sealingly engages wall 18 of enclosure 12 around opening 20. Desirably the outer frame members may be fabricated from stainless steel or aluminum although other materials may also provide the required structural properties and suitability for sterilization. Depending on the particular materials involved, sealingly mounting outer frame members 22 and 24 on the walls of their respective enclosures may be done by commonly known methods, such as welding, brazing, use of suitable adhesives, or use of bolted flange connections with sealing gaskets between flanges.

Outer frame members 22 and 24 are fabricated to define cylindrical outer ports 26 and 28 which are of equal diameters and co-axially aligned when the walled enclosures are positioned for transfer. Outer ports 26 and 28 are cylindrical so as to provide optimum structural rigidity and complete sealing when the inner frame members are positioned therein as discussed hereinbelow. Additionally, in the preferred embodiment shown the outer frame members are fabricated in shapes and sizes such that the second outer frame member 24 can be closely and telescopically received by the first outer frame member 22. Thus, frame member 22 includes a base surface portion 30 and a wall 34 extending from the base surface portion towards frame member 24, and frame member 24 includes a base surface portion 32 and a wall 36 extending towards frame member 22. The outside diameter of wall 36 is very slightly smaller than the inside diameter of wall 34, thereby enabling the outer frame members to telescopically fit together. Preferably the fit is close enough to sustain a partial vacuum in the space between the members when they telescope together, for reasons to be discussed; however, if necessary an "O" ring could be positioned between wall 34 and wall 36 to provide a seal between the two walls. Walls 34 and 36 extend equal distances from their respective base surface portions, and their distal extremities define end surfaces 38 and 40 respectively. Each of the outer frame members includes an exterior surface portion lying in a plane exterior to the enclosure in which it is mounted and surrounding its outer port; the outer surface portion of frame member 22 is the base surface portion 30, and the outer surface portion of frame member 24 is the end surface 40 of wall 36.

As is evident in FIG. 3, the distal end of wall 34 forms a flange extending radially outwardly from outer port 26, and the side of the flange opposite end surface 38 is peripherally beveled at 48; the base surface portion 32 of outer frame member 24 is similarly peripherally beveled at 50. As described hereinbelow, the bevels serve as a part of joining means for bringing and holding the first and second outer frame members together. A hole 52 is drilled through wall 34 of frame member 22 where wall 34 meets base portion 30; the function of hole 52 is discussed hereinbelow. Finally with regard to outer frame members 22 and 24, circumferential grooves 54 and 56 are formed in the inner faces of outer ports 26 and 28 respectively; the positioning and function of those grooves is discussed hereinbelow.

Cylindrical first and second inner frame members 60 and 62 are mounted within outer ports 26 and 28 respectively; inner frame member 60 defines a first circular pass-through port 72, and inner frame member 62 defines a second circular pass-through port 74. Although circular pass-through ports are depicted in the drawing figures, the invention contemplates that other shapes, e.g. square or rectangular, may be utilized depending on the particular application. The outside diameters of inner frame members 60 and 62 are very slightly smaller than the inside diameters of outer ports 26 and 28 so that either inner frame member can be slid through either outer port. Each inner frame member includes an exterior surface surrounding its pass-through port and lying in a plane perpendicular to its cylindrical axis; frame member 60 includes exterior surface 61 and frame member 62 includes exterior surface 63. When positioned for transfer, the exterior surfaces face each other.

Circumferential grooves 64 and 66 are formed in the outer faces of frame members 60 and 62 respectively and receive compressible "O" rings 68 and 70 respectively. Grooves 54 and 56 in outer frame members 22 and 24 respectively are located such that when respective circumferential grooves 64 and 66 are opposite them the exterior surface of each inner frame member is flush with the exterior surface portion of its respective outer frame member—i.e. as so located exterior surface 61 of frame member 60 is flush with exterior surface portion 30 of frame member 22 and exterior surface 63 of frame member 62 is flush with exterior surface portion 40 of frame member 24. Grooves 54, 56, 64 and 66 and "O" rings 68 and 70 are sized such that when the inner frame members are in transfer positions in their respective outer ports, as shown in FIGS. 3 through 5, the "O" rings are compressed sufficiently to make sealing contact between the facing grooves. The "O" rings thus serve as means for positioning the inner frame members within their respective outer frame members as well as means for sealing the interface between each inner and outer frame member against the passage of air or other unwanted contaminants. Moreover, use of the "O" rings facilitates "snap-in" insertion of the inner frame members to their transfer positions, as will be discussed further hereinbelow.

Figure 1:
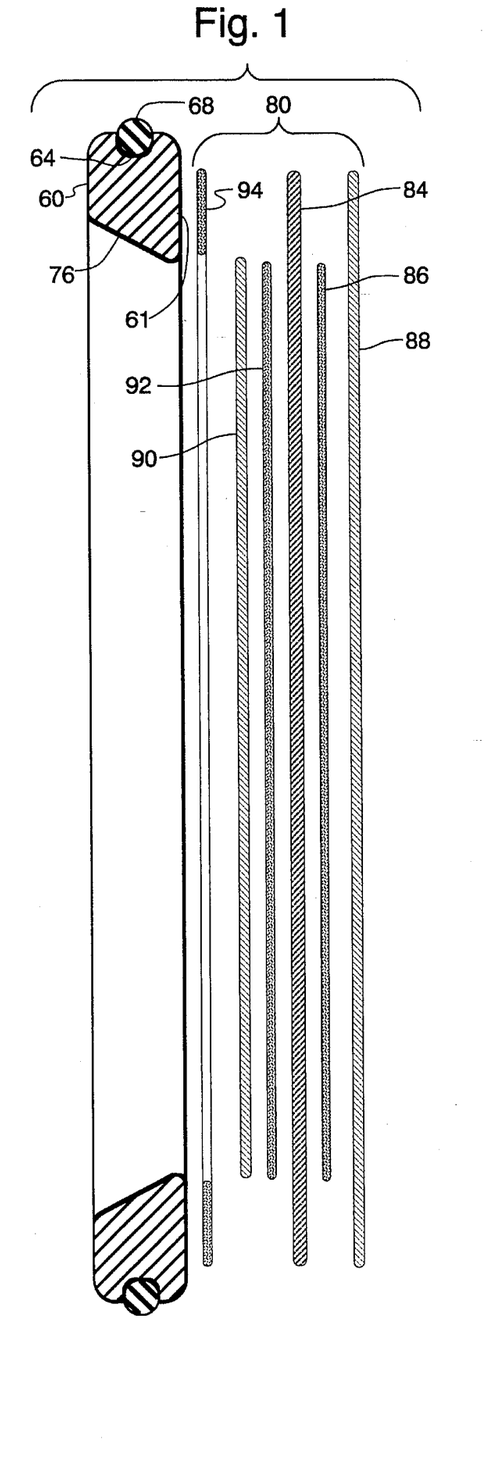
FIG. 1 is an exploded cross sectional view of a first inner frame member and three-ply film member.
Figure 2:
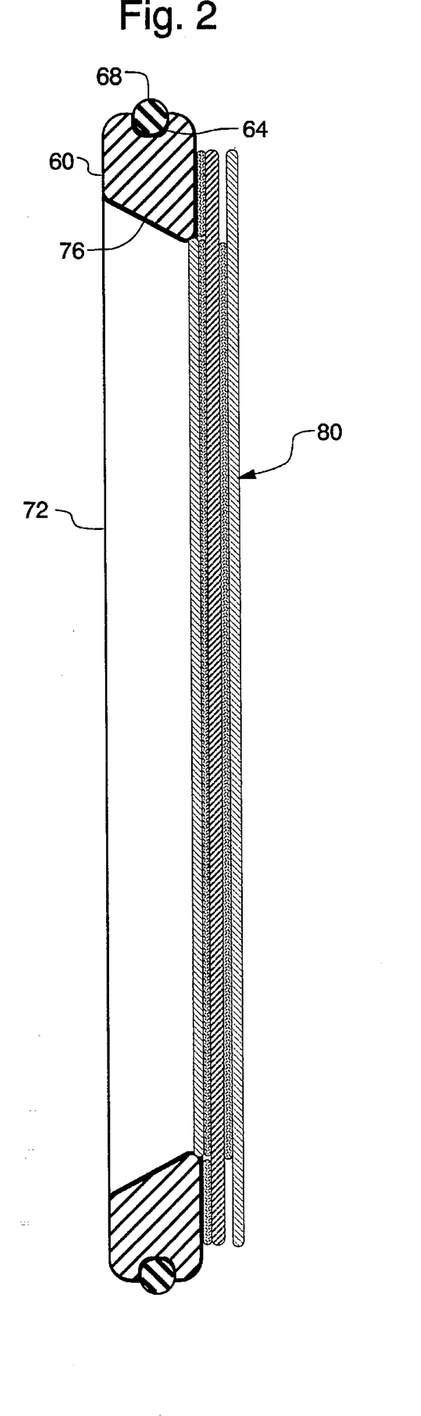
FIG. 2 shows the combination of FIG. 1 but in collapsed view with the film member attached to the inner frame member.

Impermeable film members 80 and 82 are attached respectively to the exterior surfaces 61 and 63 of inner frame members 60 and 62 so as to sealingly cover pass-through ports 72 and 74 respectively. FIGS. 1 and 2 show in greater detail the presently preferred construction of film member 80; the structure of film member 82 is identical to that of film member 80, but is reversed viewing FIGS. 4 and 5 because the exterior surfaces of the inner frame members are facing each other. As indicated in the drawing figures, each film member as attached forms a planar surface over its respective pass-through port. The planar surfaces formed by film members 80 and 82 are on the exterior of the overall structure—i.e. they face each other when the two walled enclosures are positioned for transfer. Turning now to FIGS. 1 and 2, each of the impermeable film members of the preferred embodiment shown comprises a three-ply structure. With reference to film member 80, the first ply 84 is a circular piece of aluminum foil having the diameter shown in FIG. 1—i.e. extending beyond the edges of pass-through port 72; although I prefer to use aluminum foil, other sheet-like materials such as other metal foils or non-metallic materials may be equally useful for ply 84 depending on the specific application. The planar surface formed by aluminum foil 84 is coated with adhesive means 86 of a type which will cause the two opposing planar surfaces to adhere when in contact with each other; the adhesive means may be applied to only one of the planar surfaces, but I prefer to apply such means to both of the facing planar surfaces. Attached to the layer of adhesive means 86 is a removable protective film layer 88, the function of which is to keep the adhesive surface fresh until the time for transfer. Protective layer 88 may be formed from plastic or paper as is common in "peel-off" protective coverings applied to many adhesive surfaces. The third ply of the film member is a layer of low density polyethylene film 90 which is aligned with and sized to conform to pass-through port 72. Film 90 is attached by a suitable adhesive 92 to the surface of the aluminum foil 84 opposite the planar surface—i.e. opposite adhesive means

86. The aluminum foil extending beyond film 90 is attached to the exterior surface 61 of inner frame member 60 by suitable adhesive 94, which may in some cases be the same as adhesive 92. FIG. 2 shows film means 80, in exaggerated scale for clarity, as attached to frame member 60 prior to transfer of material between the two walled enclosures.

Use of the preferred port system according to the invention for transfer of sterile material is illustrated in FIGS. 6A through 6I, in all of which the sections of the two walled enclosures have been omitted for clarity and simplicity.

Figure 6A:
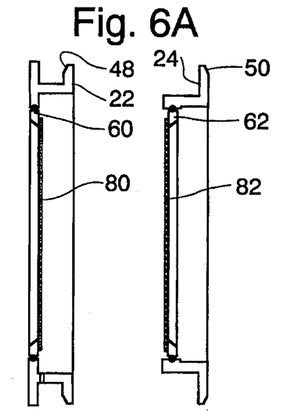
FIGS. 6A through 6I are cross sectional views showing sequential steps in using the port system of the invention for transfer of sterile material from one walled enclosure to another.

FIG. 6A shows the components of the system in position prior to transfer; it will be recognized that the relative positions are similar to those shown in greater detail in FIGS. 3 and 4. Inner frame members 60 and 62 are in place in their respective outer frame members 22 and 24 with grooves 54 and 56 facing grooves 64 and 66 respectively and "O" rings 68 and 70 in sealing engagement with the grooves, and film members 80 and 82 are fastened to their respective inner frame members and sealingly cover the two pass-through ports.

Figure 6B:
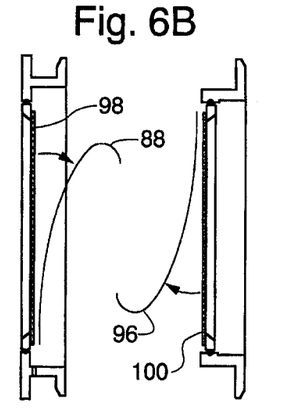

In FIG. 6B protective film layers 88 and 96 are removed from film layers 80 and 82, thereby exposing the adhesive surfaces on planar surfaces 98 and 100 to the non-sterile outside atmosphere.

Figure 6C:
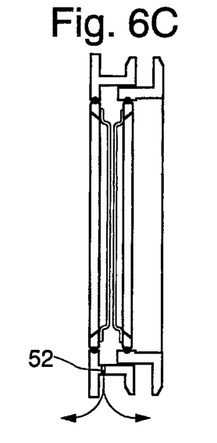

In FIG. 6C the two enclosures have been moved toward each other, with outer frame member 24 telescopically received by outer frame member 22; as the two outer frame members move together, the substantially enclosed volume formed by the telescoping walls 34 and 36 becomes smaller; in order to prevent air pressure from building up between the facing planar surfaces, thereby possibly impeding the adherence of those surfaces, hole 52 allows the air to escape in the direction of the arrows. Preferably I attach a small vacuum generator to hole 52 to create a partial vacuum between the facing planar surfaces which tends to ensure complete adhering contact over the full area of the planar surfaces.

Figure 6D:
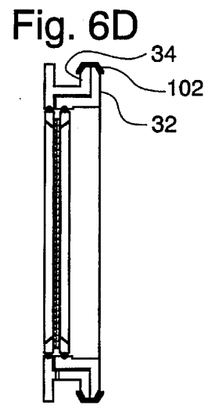
Figure 6E:
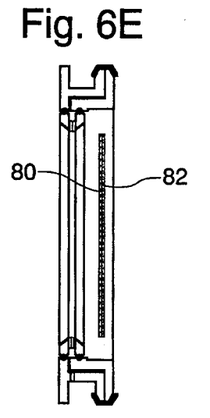

When the two outer frame members are close enough to each other, FIG. 6D, a ring clamp 102 is applied around the edges of wall 34 of outer frame 22 and base portion 32 of outer frame member 24; the ring clamp is shaped to bear on the bevels 48 and 50 formed on the respective edges, and as it is tightened it draws the two outer frame members together so that their exterior surface portions 30 and 40 abut and the planar surfaces 98 and 100 of film members 80 and 82 adhere to each other. Importantly with regard to the advantages of the invention, it should be noted that when the exposed non-sterile adhesive surfaces are together in adhering relationship, they cover each other and retain any contaminants between them, thus preventing exposure of the contaminants to the sterile environments within the walled enclosures.

Figure 6F:
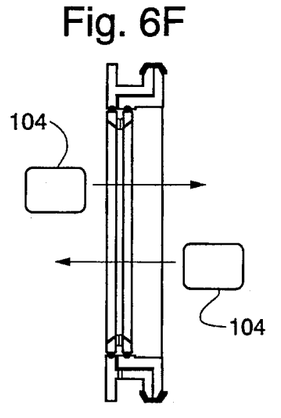

For transfer of material between the first and second walled enclosures, the portions of the adhered film members 80 and 82 covering pass-through ports 72 and 74 must be removed. In this regard, inner frame members 60 and 62 are fabricated to make the inner faces of pass-through ports 72 and 74 sloped so that the port opening of each is smaller on the side to which the film member is attached; with circular ports as in the preferred embodiment shown, the pass-through port walls form frustums of cones. Thus, when the assembly is sealingly joined the inner surfaces of the pass-through ports form a peak at their meeting point, as seen clearly in FIG. 5. In such condition, and with the three-ply film member construction illustrated in FIGS. 1 and 2, pressure applied from the interior of either walled enclosure against the respective polyethylene film ply of the film member causes the portions of the aluminum foil plies covering the pass-through ports to separate from the remaining portions of the film members. Such separation is shown schematically in FIG. 6E; the separated sections of the adhered film members are discarded. Normally the inner and outer frame members, or at least the surfaces thereof exposed to the interior of the walled enclosures, have been sterilized prior to bringing the assembly together; thus, after removal of the film member sections from the pass-through ports, it will be seen that the only exposed non-sterilized surfaces are the edges of the aluminum foil plies surrounding the pass-through port. FIG. 6F shows sterile material 104 being transferred through the pass-through port formed by the joined frame members.

Figure 6G:
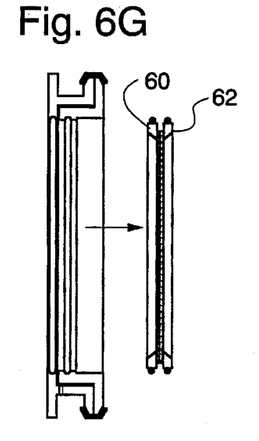
Figure 6H:
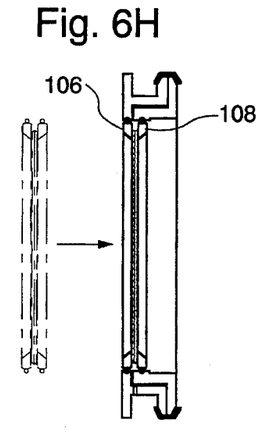
Figure 6I:
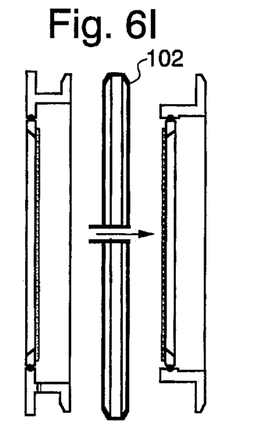

After transfer has been completed, it is generally desired to reseal the ports to maintain sterility within the walled enclosures when they are separated. To accomplish this, as shown in FIG. 6G and 6H, inner frame members 60 and 62 are slid out of their original positions in outer frame members 22 and 24 and a new set of inner frame members 106 and 108, having unbroken film members with adhesive means covered with the protective film layers, are "snapped" into position in the frame members. Thereafter the clamp 102 is removed and the two outer frame members are separated, FIG. 6I, with sterility of the environments in the walled enclosures intact. Inner frame members 60 and 62 can be made suitable for re-use by removal of the residual film member and application of new film members.

Obviously, variations on the above-described preferred port system can be made within the scope of the invention. For example, instead of using the three-ply film members shown in the drawing figures, a single ply of film may be used; optionally a line of minute perforations may be formed through each film around and slightly outside its respective port opening—i.e. within the area of the inner frame member's exterior surface—to prevent leakage of air through the perforations into the sterilized interior of the walled enclosure. If a protective covering layer is used on the adhesive means, the film member would of course be a two-ply unit; the protective layer should also cover perforations if present, adding further protection against leakage prior to transfer. With the optional perforated construction, pressure against either film member within its respective enclosure causes the film members to tear along the lines of their perforations, thereby effecting the desired separation of the port-covering portions.

Selection of specific materials such as the adhesive compounds, rubber or the like for "O" rings, etc., is believed to be a matter of ordinary skill in the art, given the requirements set forth hereinabove. With regard to the adhesive means applied to the planar surfaces of the film members, however, it may be found desirable to include a suitable preservative or sterilizing agent in the compound to further enhance sterility of the assembly.

Besides being of non-complex construction and simplicity and effectiveness of use, the transfer port system according to the invention lends itself admirably to use with multiple combinations of walled enclosures—i.e. a group of enclosures could have identically sized first outer frame member assemblies of the preferred embodiment affixed to their walls, such that one walled enclosure fitted with a suitably sized second outer frame member assembly could be used for transfer of materials between that enclosure and any of the former group of enclosures.

While I have shown and described a present preferred embodiment of the invention, it is to be distinctly understood that the invention is not limited thereto but may be otherwise various embodied within the scope of the following claims.

I claim:

1. A port system for allowing the transfer of material between sterile environments maintained in first and second walled enclosures which have been positioned such that a wall of the first enclosure faces and is proximate to a wall of the second enclosure, the facing walls of the first and second walled enclosures having respectively first and second openings formed therein and facing each other, the port system comprising:

a) first and second outer frame members for mounting in the first and second openings respectively, each outer frame member being adapted to sealingly engage the enclosure wall around the opening in which it is mounted, the first and second outer frame members respectively defining first and second cylindrical outer ports of equal diameters which are axially aligned when the outer frame members are mounted in the openings, each outer frame member having an exterior surface portion surrounding its outer port and located so as to lie in a plane exterior to the enclosure in which it is mounted;

b) first and second cylindrical inner frame members sized to be closely receivable in either of the outer ports, the first and second inner frame members respectively defining first and second pass-through ports of substantially identical size and shape, each inner frame member including an exterior surface which surrounds its pass-through port and lies in a plane perpendicular to its cylindrical axis;

c) means for removably and sealingly mounting the first and second inner frame members within the first and second outer ports respectively in positions such that the exterior surface of each inner frame member is flush with the exterior surface portion of its respective outer frame member and faces the exterior surface of the other inner frame member;

d) first and second impermeable film members attached respectively to the exterior surfaces of the first and second inner frame members and sealingly covering the first and second pass-through ports respectively, each film member forming a planar surface over its respective pass-through port;

e) adhesive means applied to at least one of the planar surfaces and capable of causing the planar surfaces to adhere when brought into contact with each other;

f) means for enabling separation of the portion of each film member covering its respective pass-through port from the remainder of the film member; and g) joining means for bringing and holding the first and second outer frame members together-in such relationship that the planar surfaces make adhering contact with one another.

2. A port system as claimed in claim 1 in which:

a) the first and second outer frame members comprise first and second base surface portions respectively and first and second walls extending toward each other for equal distances from the first and second base surface portions respectively, the distal extremity of each wall defining an end surface, the walls being shaped and sized such that the second wall can be closely telescopically received within the first wall, the first base surface portion constituting the exterior surface portion of the first outer frame member, the end surface of the second wall constituting the exterior surface portion of the second outer frame member;

b) the joining means is so constructed and arranged as to draw the first and second outer frame members telescopically together until their respective exterior surface portions abut, whereby during such drawing together a substantially enclosed space is formed between the first and second film members, the volume of which decreases as the respective exterior surface portions approach each other; and c) the port system further includes means for effecting the removal of air from the space formed between the first and second film members as the first and second frame members are drawn together by the joining means, whereby the first and second planar surfaces make adhering contact when the exterior surface portions of the outer frame members abut.

3. A port system as claimed in claim 2 wherein the means for removably and sealingly positioning each inner frame member within its respective outer port comprises a first circumferential groove formed in the outer face of the inner frame member, a second circumferential groove formed in the inner face of the outer port in such position that when the first and second circumferential grooves are facing each other the exterior surface of the inner frame member is flush with the exterior surface portion of the outer frame member, and a compressible "O" ring received in the first circumferential groove to a depth such that when the first and second circumferential grooves are facing each other the "O" ring is compressed sufficiently to make sealing contact with the second circumferential groove.

4. A port system as claimed in claim 3 in which the pass-through port is of circular-shape.

5. A port system as claimed in any of claims 1 through 3 in which each of said first and second film members comprises a three-ply construction in which the first ply is aluminum foil extending beyond the edges of the pass-through port and attached to the exterior surface of its respective inner frame member, the aluminum foil ply forming the planar surface and having the adhesive means applied as a layer thereto; the second ply is a removable protective film layer attached to the adhesive means layer; and the third ply is a layer of low density polyethylene film aligned with and sized to conform to the pass-through port and adhesively attached to the surface of the aluminum foil on the reverse side of the planar surface.

6. A port system as claimed in claim 5 wherein the surface of each inner frame member which forms the inner face of its pass-through port is sloped such that the pass-through port opening becomes smaller in the direction of the film member.

7. A port system as claimed in claim 6 in which the pass-through port is of circular shape.

8. A system for allowing the sterile transfer of material between first and second walled enclosures, comprising:

a) a first enclosure having a first port in one wall thereof;

b) a second enclosure having a second port in one wall thereof, the second port being of the same size and shape as the first port;

c) first and second impermeable film barrier means sealingly attached respectively to the first and second enclosures and covering the first and second ports respectively, the first and second film barrier means each comprising a substantially planar surface exterior to its respective enclosure and at or above the surface of the enclosure wall surrounding it, each film barrier means being so constructed and arranged that the portion thereof coextensive with its respective port can be separated from the remainder thereof; and d) adhesive means applied to the exterior surface of at least one of the first and second film barrier means and capable of causing the exterior surfaces of both said film barrier means to adhere when brought into contact with one another.

9. A port system for allowing the transfer of material between sterile environments maintained in first and second walled enclosures, comprising:

a) first and second walled enclosures positioned such that a wall of the first enclosure faces and is proximate to a wall of the second enclosure;

b) first and second openings formed in the facing walls of the first and second enclosures, respectively;

c) first and second outer frame members mounted in the first and second openings respectively, each outer frame member sealingly engaging the enclosure wall around the opening in which it is mounted, the first and second outer frame members respectively defining first and second cylindrical outer ports which are of equal diameters and axially aligned, each outer frame member having an exterior surface portion surrounding its outer port and lying in a plane exterior to the enclosure in which it is mounted;

d) first and second cylindrical inner frame members sized to be closely receivable in either of the outer ports, the first and second inner frame members respectively defining first and second pass-through ports of substantially identical size and shape, each inner frame member including an exterior surface which surrounds its pass-through port and lies in a plane perpendicular to its cylindrical axis;

e) means for removably and sealingly mounting the first and second inner frame members within the first and second outer ports respectively in positions such that the exterior surface of each inner frame member is flush with the exterior surface portion of its respective outer frame member and faces the exterior surface of the other inner frame member;

f) first and second impermeable film members attached respectively to the exterior surfaces of the first and second inner frame members and sealingly covering the first and second pass-through ports respectively, each film member forming a planar surface over its respective pass-through port, the planar surfaces facing each other;

g) adhesive means applied to at least one of the planar surfaces and capable of causing the planar surfaces to adhere when brought into contact with each other;

h) means for enabling separation of the portion of each film member covering its respective pass-through port from the remainder of the film member; and i) joining means for bringing and holding the first and second outer frame members together in such relationship that the planar surfaces make adhering contact with one another.

* * * * *